United States Patent [19]

Van Gompel

[11] 4,317,645

[45] Mar. 2, 1982

[54] CARGO RETAINER

[75] Inventor: James J. Van Gompel, Fremont, Ind.

[73] Assignee: N. P. Marketing Corporation, Neenah, Wis.

[21] Appl. No.: 168,670

[22] Filed: Jul. 11, 1980

[51] Int. Cl.³ .............................................. B61D 45/00
[52] U.S. Cl. ...................................... 410/94; 206/386; 280/43.24; 280/475
[58] Field of Search ................ 410/94, 121, 129, 146, 410/142, 156; 280/475, 43.24; 206/386

[56] References Cited

U.S. PATENT DOCUMENTS 3,181,891  5/1965  Moats ................................ 280/475

4,147,112  4/1979  Green et al. ........................ 410/94

*Primary Examiner*—Richard A. Bertsch
*Attorney, Agent, or Firm*—Andrus, Sceales, Starke & Sawall

[57] ABSTRACT

A cargo retainer having a floor contacting member provided with an upwardly facing load bearing surface and an upright member secured adjacent to one end of the floor contacting member is provided with a floor piercing element. The floor piercing element is movably mounted adjacent to the juncture between the floor contacting member and the upright member and is movable between a floor piercing position and a position rendering the element incapable of piercing the floor.

10 Claims, 8 Drawing Figures

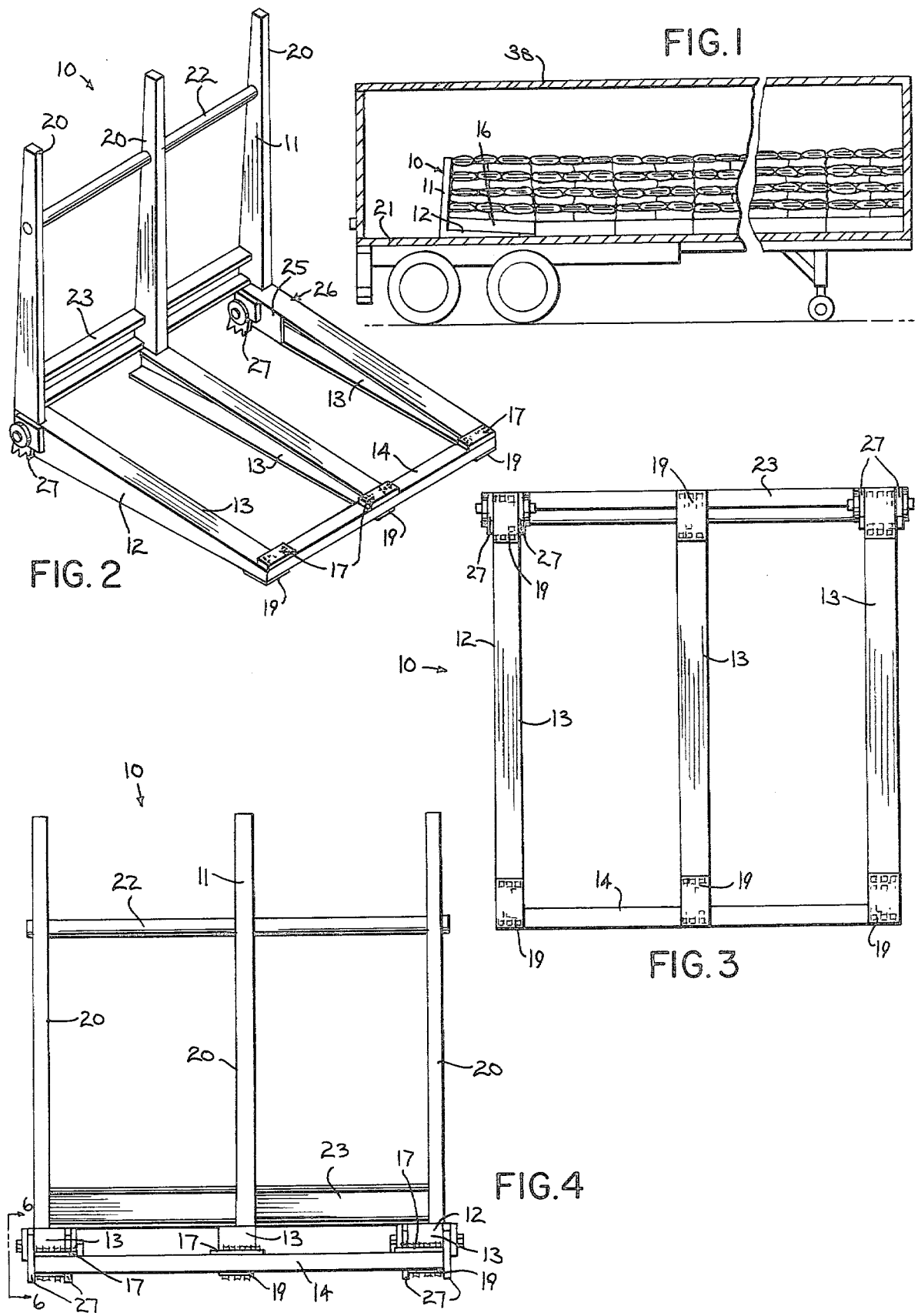

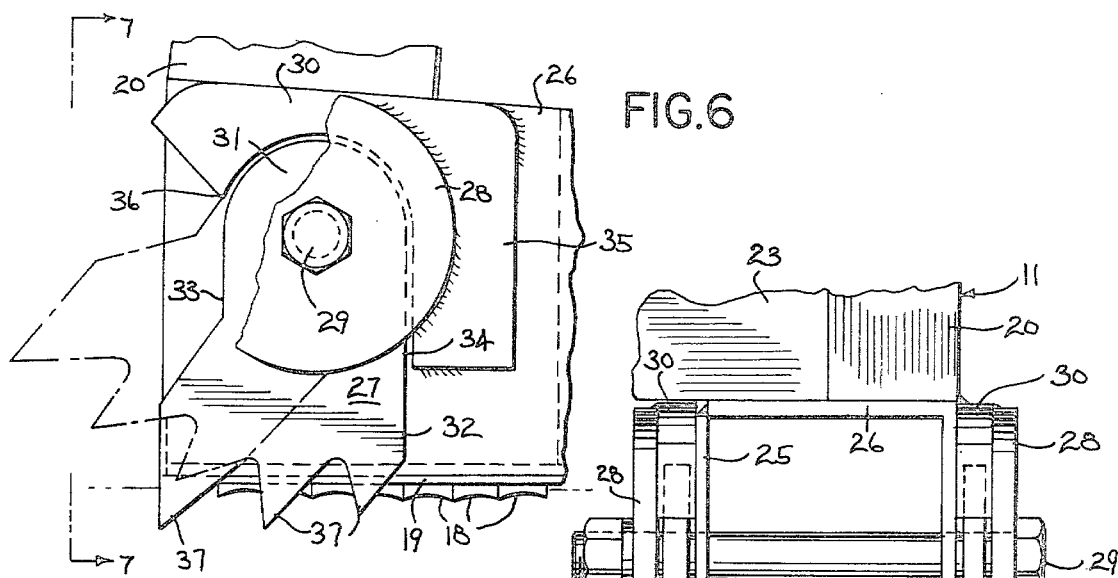
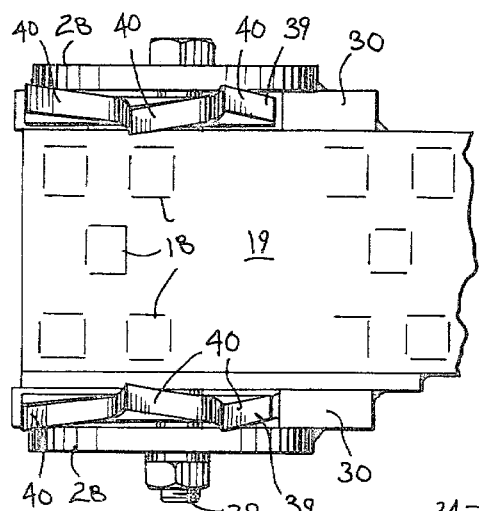
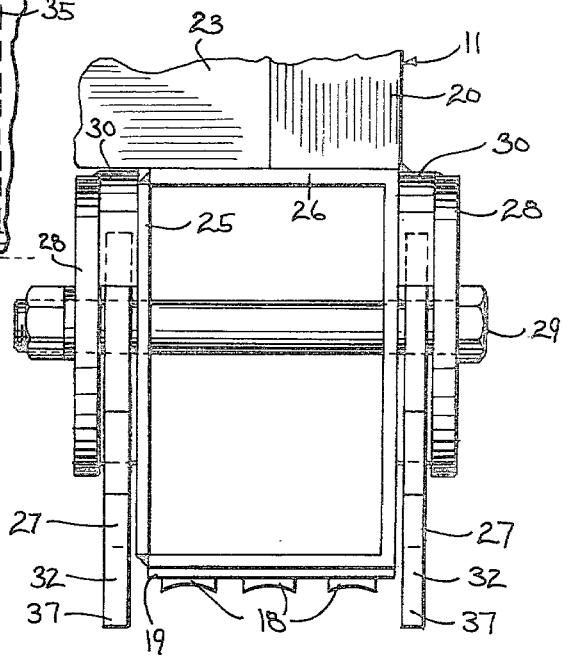
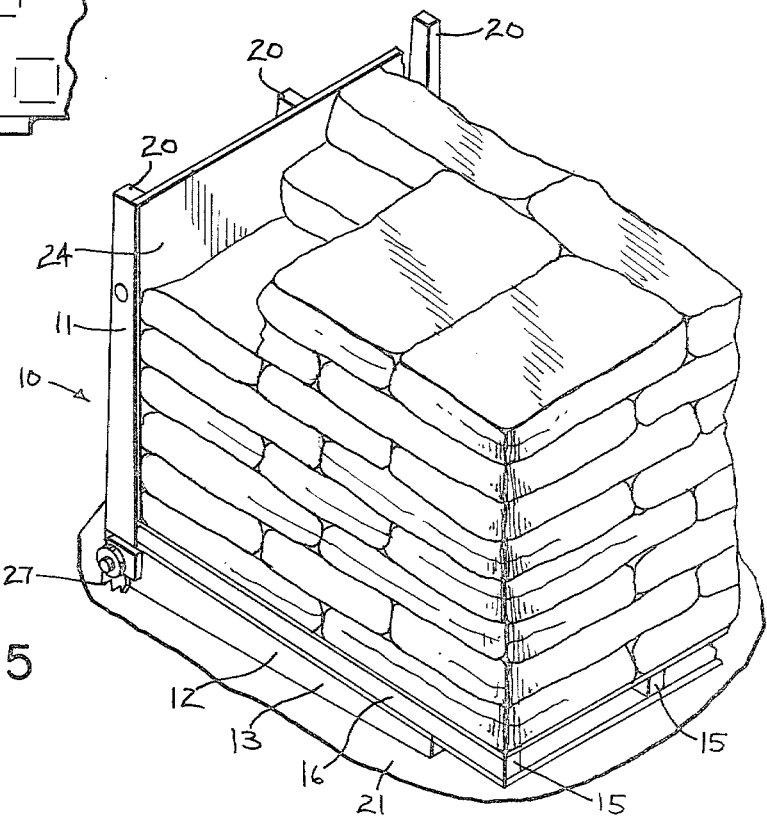

CARGO RETAINER

BACKGROUND OF THE INVENTION

This invention relates to an improved cargo retainer for generally maintaining the integrity of a cargo load both as to its compactness and its location within a carrier. Such retainers find utility, particularly for palletized cargo, in carriers having wood floors including railroad cars, trucks, ships, airplanes, and within the receptacles for containerized shipping.

Unless a cargo load is adequately secured within its carrier, it is apt to move or shift which generally results in damaged lading, and also frequently, damage to the carrier. Heretofore, shippers have generally found it necessary to rely on banding, blocking and/or bracing to secure the cargo load and provide for its integrity. Such practices, however, are not only time consuming and costly, but also rely heavily on individual judgment for their adequacy.

U.S. Pat. No. 4,147,112 issued to Green et al relates to a cargo support or retainer which tries to substantially or wholly avoid the necessity for the practices of banding, blocking and/or bracing. Cargo supports units made generally according to U.S. Pat. No. 4,147,112, however, failed to provide for load integrity at least when used in truck trailers mounted for piggy-back service on railroad cars. It is generally an object of this invention to improve upon such cargo support units and assure the capability to provide for load integrity even under the severe demands imposed upon truck trailers mounted for piggy-back service on railroad cars.

SUMMARY OF THE INVENTION

The invention relates to a cargo retainer having a lower floor contacting member provided with an upwardly facing load bearing surface and an upright member secured adjacent to one end of the floor contacting member. A floor piercing element is movably mounted adjacent to the juncture of the floor contacting member and the upright member. The floor piercing element is movable between a floor piercing position and a position rendering the element incapable of piercing the floor.

DESCRIPTION OF THE DRAWING FIGURES

The drawings furnished herewith illustrate the best mode presently contemplated for carrying out the invention and are described hereinafter.

In the drawings:

FIG. 1 is a sectional elevational of a loaded truck trailer showing the cargo retainers of this invention in service;

FIG. 2 is a perspective view of the improved cargo retainer of this invention;

FIG. 3 is a bottom view of the cargo retainer of FIG. 2;

FIG. 4 is a frontal view of the cargo retainer of FIG. 2;

FIG. 5 is a view generally similar to that of FIG. 2 and shows a pallet in place on the cargo retainer and a partial backing board disposed vertically adjacent to the upright frame portion;

FIG. 6 is a detail view taken generally along the line 6—6 of FIG. 4 with parts broken away, and in phantom lines shows the toothed pivotal member in its retracted position relative to the floor;

FIG. 7 is a detail view taken generally along the line 7—7 of FIG. 6; and

FIG. 8 is a bottom detail view and shows a further embodiment of the invention.

DESCRIPTION OF THE ILLUSTRATED EMBODIMENTS

Referring to the drawings, the cargo retainer 10 comprises a generally L-shaped unit wherein the lower end of a generally vertical upright frame portion 11 is joined adjacent to the rear extremity of a generally horizontal floor contacting frame portion 12.

The floor contacting frame portion 12 generally comprises three transversely spaced legs 13 which are connected at their forward or remote end by a transversely extending brace member 14. The spacing between the legs 13 generally corresponds to the spacing between the framing runners 15 of the cargo pallets 16 so that in service the pallet runners are disposed over the cargo retainer legs. The legs 13 are tapered toward their remote end to provide a lesser depth forwardly so that the pallet 16 resting thereon in service assumes an incline in the direction away from the upright portion 11. Plates 17 with upwardly projecting cleats 18 formed by perforations in the plates are secured to the upper surface of the brace member 14 adjacent to each leg 13 to generally prevent sidewise movement of the pallet 16 relative to the cargo retainer 10. Generally similar plates 19 with downwardly projecting cleats 18 are secured adjacent to the respective ends of the bottom floor contacting surface of the several legs 13 as shown in FIG. 3.

The upright frame portion 11 generally comprises three transversely spaced posts 20 which extend upwardly from the corresponding legs 13. The posts 20 extend generally normal to the tapered legs 13 so that the frame portion 11 is inclined forwardly relative to the floor 21. The posts 20 may taper to have a lesser depth at their upper end as generally shown in FIG. 2. Adjacent to their upper end, a brace member 22 extends between and is connected to the posts 20. A lower brace member 23 extends between and is connected to the posts 20 adjacent to their juncture with the legs 13 and is thus disposed in spaced relation to the floor 21 while also serving to provide bracing for the rearward ends of legs 13. In service, a backing board 24 is usually vertically disposed between the upright frame portion 11 and the cargo loaded on the pallet 16 as generally shown in FIG. 5.

The outer legs 13 of the floor contacting portion 12 are formed as channel section members which open inwardly in facing relation as generally shown in FIGS. 2 and 7. At the rear of the outer legs 13 adjacent to the juncture with the upright portion 11, a filler plate 25 extends across the channel to form a box section portion 26 of perhaps best shown in FIG. 7.

The rear box section portion 26 of the respective outer legs 13 each support a pair of spaced pivotal members 27 to thus provide a total of four (4) such members on the cargo retainer 10. The pivotal members 27 are disposed on opposite sides of the leg 13 intermediate the leg and an outer support member 28 secured to the leg. The member 27 is pivotally disposed on a pin or bolt 29 which extends transversely through aligned holes in the box section portion 26 and the respective outer support members 28. An inverted, generally J-shaped bolster plate 30 is secured on each side of the leg 13 between the leg and corresponding outer support member 28 in radial alignment with the corresponding pivotal member 27.

The pivotal member 27 includes an upper arcuate portion 31 which is at a given radial distance from the pivot axis and is rotatable relative to the bolster plate 30, and a diametrically opposed toothed portion 32 which is at a substantially greater radial distance from the pivot axis. Diametrically opposed, parallel portions 33 and 34 extend between the arcuate portion 31 and the toothed portion 32. Due to the generally larger size and greater radial distance from the pivot axis, the toothed portion 32 will normally assume a downwardly disposed position as generally shown in FIG. 6.

The leg 35 of the bolster plate 30 generally precludes counterclockwise movement of the pivotal member 27 as viewed in FIG. 6. As generally shown by phantom lines in FIG. 6, pivotal member 27 is clockwise rotatable at least until the straight portion 33 makes contact with the corner projection 36 of the bolster plate 30. It should be understood that the pivotal member 27 on the opposite side of the common retainer leg 13 is oriented as a mirror image on the pivot axis and would be reversely movable for a similar result.

In the normally assumed position for the member 27 the teeth 37 of portion 34 project downwardly beyond the cleats 18 of plates 19. When subjected to the weight of a cargo load in service, the teeth 37 are driven to penetrate or pierce a wood floor 21 and generally to the extent that the cleats 18 also frictionally engage the floor as generally shown in FIG. 6. When the cargo retainer 10 is seated on a floor out of service, the pivotal member 27 may be caused to assume the phantom line position of FIG. 6 so that the teeth 37 are not unduly worn.

With further reference to FIG. 6, it will be observed that in the normally assumed position of the pivotal members 27, the rearwardly facing edge of teeth 37 extends vertically or nearly so. Under the severe demands imposed upon a loaded truck trailer 38 mounted for piggy-back service on a railroad car as generally depicted in FIG. 1, the trailer and its cargo load may be subjected to impacts from the front or back, particularly during bumping or freight car sorting procedures. In the case of a frontal impact, the teeth 37 with vertical or near vertical rearwardly facing edges will substantially hold position to keep the cargo load away from the rear door even while some voids may be created in the load by possible compaction. In the event of a rear impact, the teeth 37 can more readily be dislodged forwardly to assume a new position (not, however, in the fully palletized loading arrangement illustrated in FIG. 1) if voids existed in the cargo load. Thus, the cargo retainer 10 of this invention is better able to maintain the integrity of the cargo load.

In the embodiment of FIG. 8, the pivotal member 39 is generally similar to the member 27 except that the teeth 40 are bent to be axially offset relative to each other. The offset condition of the teeth 40 staggers the gripping pattern of the pivotal member 39.

In the use of the cargo retainer 10, a fork lift unit is generally utilized and initially seats the load on the retainer from the front. In the case of a palletized load as shown in FIG. 5, the framing runners 15 of the pallet 16 are seated directly over the legs 13. After the load is properly seated on the cargo retainer 10, the retainer and load together are picked up from the rear and moved into location. For the loading illustrated in FIG. 1, only the last loaded pallet is seated on the cargo retainer 10 to secure the integrity of the load in the fore and aft direction between the retainer and the front end of the trailer 38. When necessary and/or desired, the cargo retainers 10 may be utilized to generally preclude lateral movement as well.

Various modes of carrying out the invention are contemplated as being within the scope of the following claims particularly pointing out and distinctly claiming the subject matter which is regarded as the invention.

I claim:

1. In a cargo retainer having a lower floor contacting member provided with an upwardly facing load bearing surface and an upright member secured adjacent to one end of the floor contacting member, a floor piercing element, said element being movably mounted adjacent to the juncture of the floor contacting member and the upright member and being movable between a floor piercing position and a position rendering said element incapable of piercing the floor.

2. The structure as set forth in claim 1 wherein the floor piercing element is normally oriented to the floor piercing position.

3. The structure as set forth in claim 1 wherein a plurality of movable floor piercing elements are provided adjacent to the juncture between the floor contacting member and the upright member.

4. The structure as set forth in claim 1 wherein the floor piercing element is a pivotal member provided with teeth for piercing the floor.

5. The structure as set forth in claim 4 wherein the teeth are axially offset relative to each other.

6. The structure as set forth in claim 1 wherein the floor contacting member comprises a plurality of transversely spaced legs which extend forwardly from the juncture with the upright member, and a floor piercing element is provided on opposite sides of at least one of said legs.

7. The structure as set forth in claim 6 wherein floor piercing elements are provided on opposite sides of at least the transversely outermost legs.

8. The structure as set forth in claim 1 wherein the floor piercing element is a pivotal member, said pivotal member normally being oriented to the floor piercing position and having teeth for piercing the floor, said teeth having generally vertically extending rearwardly facing edges when disposed in their normal orientation.

9. In a device for restraining a cargo load wherein the load is confined forwardly and extends rearwardly from such confinement, comprising an elongated floor contacting member provided with an upwardly facing load bearing surface, said member being adapted to project forwardly beneath a rearmost portion of the cargo load, a generally upright member secured to the floor contacting member in spaced relation from the forward end of the floor contacting member for engaging with the rearward end of the cargo load, and a floor piercing element, said element being movably mounted on the floor contacting member adjacent to the rearward end thereof and being movable between a floor piercing position and a position rendering said element incapable of piercing the floor.

10. In a device for restraining a cargo load, an elongated floor contacting member provided with an upwardly facing load bearing surface, said member being adapted to project forwardly beneath a portion of the cargo load, a generally upright member secured to the floor contacting member in spaced relation from the forward end of the floor contacting member for engaging with the cargo load, and a floor piercing element movably mounted on the floor contacting member adjacent to the rearward end thereof, said floor piercing element being normally disposed to pierce the floor when the floor contacting member of the restraining device is under load in service and being movable to a position incapable of piercing the floor when the restraining device is out of service.

* * * * *

UNITED STATES PATENT AND TRADEMARK OFFICE
CERTIFICATE OF CORRECTION

PATENT NO. : 4,317,645
DATED : March 2, 1982
INVENTOR(S) : JAMES J. VAN GOMPEL

It is certified that error appears in the above-identified patent and that said Letters Patent are hereby corrected as shown below:

Column 2, Line 24    Cancel "away from" and substitute therefor ----toward----

Column 2, Line 56    Cancel "of" and substitute therefor ----as----

Column 3, Line 43    Cancel "bumping" and substitute therefor ----humping----

Signed and Sealed this

Tenth Day of August 1982

[SEAL]

Attest:

Attesting Officer

GERALD J. MOSSINGHOFF
Commissioner of Patents and Trademarks